United States Patent [19]

Hart

[11] Patent Number: 5,236,591
[45] Date of Patent: Aug. 17, 1993

[54] METHOD OF REMOVING BENZENE FROM PETROLEUM DESALTER BRINE

[75] Inventor: Paul R. Hart, The Woodlands, Tex.

[73] Assignee: Betz Laboratories, Inc., Trevose, Pa.

[21] Appl. No.: 843,747

[22] Filed: Feb. 28, 1992

[51] Int. Cl.$^5$ .................................... C02F 1/26
[52] U.S. Cl. .................................... 210/639; 210/708; 210/728; 210/735; 210/737; 210/909
[58] Field of Search ............... 210/634, 638, 639, 708, 210/725, 727, 728, 735, 736, 737, 909

[56] References Cited

U.S. PATENT DOCUMENTS

| | | | |
|---|---|---|---|
| 3,940,334 | 2/1976 | Miyazawa | 210/639 |
| 4,032,439 | 6/1977 | Oldham | 210/618 |
| 4,800,039 | 1/1989 | Hassick et al. | 252/181 |
| 4,947,885 | 8/1990 | Hart | 210/708 |
| 4,992,210 | 2/1991 | Naeger et al. | 252/389 |
| 5,045,212 | 9/1991 | Augustin et al. | 210/708 |
| 5,154,831 | 10/1992 | Darian et al. | 210/639 |

*Primary Examiner*—Peter Hruskoci
*Attorney, Agent, or Firm*—Alexander D. Ricci; Steven D. Boyd

[57] ABSTRACT

A method of enhancing the removal of a benzene from a petroleum refinery desalter effluent brine is described. The method involves treating the effluent brine with a combination of aluminum chlorhydrate and a water soluble cationic polymer followed by solvent extraction. The preferred cationic polymer is polydiallyldimethylammonium chloride.

3 Claims, No Drawings

METHOD OF REMOVING BENZENE FROM PETROLEUM DESALTER BRINE

FIELD OF THE INVENTION

The present invention relates to the treatment of a petroleum refinery desalter effluent brine. More specifically, the present invention relates to the treatment of the effluent brine from a petroleum refinery desalter to remove benzene by first removing oily solids and thereafter treatment by solvent extraction.

BACKGROUND OF THE INVENTION

The crude petroleum oil charge entering a petroleum refinery contains a number of impurities harmful to the efficient operation of the refinery and detrimental to the quality of the final petroleum product. Salts such as magnesium chloride, sodium chloride, and calcium chloride are present in most petroleum charges in amounts from about 3 to 200 pounds per thousand barrels of crude oil. These salts are unstable at elevated temperatures. If allowed to remain with the petroleum charge throughout the various stages of the refinery operation the salts will disassociate and the chloride ions will hydrolize to form hydrochloric acid. Hydrochloric acid, as well as organic acids which are present to varying degrees in the petroleum crude contribute to corrosion in the main fractionator unit and other regions of the refinery system where temperatures are elevated, and where water condenses.

Crude oil desalting is a common emulsion breaking method where an emulsion is first intentionally formed. Water is added in an amount of approximately 5% to 10% by volume of crude. The added water is intimately mixed with the crude oil to contact the impurities therein thereby transferring these impurities into the water phase of the emulsion. The emulsion is usually resolved with the assistance of emulsion breaking chemicals, characteristically surfactants, and by the known method of providing an electrical field to polarize the water droplets. Once the emulsion is broken, the water and petroleum media form distinct phases. The water phase is separated from the petroleum phase and subsequently removed from the desalter. The petroleum phase is directed further downstream for processing through the refinery operation.

The water phase, an effluent brine, will contain the salts removed from the petroleum charge. Also present in the desalter effluent brine will be oily solids which remain due to inefficiencies in breaking of the oil - water emulsion and benzene. Because benzene is a volatile organic carcinogen its content in wastewater is restricted by environmental regulations. Accordingly, the effluent brine typically must be treated to reduce the amount of benzene to acceptable levels for disposal.

The combination of dispersed oil, solids, oily solids and benzene in the effluent brine make treatment difficult. The benzene can be removed by solvent extraction with a petroleum distillate oil solvent. However, the dispersed oil, solids and oily solids can interfere with this extraction process. The present inventor discovered that appropriate treatment of the effluent brine, while hot or when it is subsequently reheated can enhance the removal of benzene from the effluent brine.

SUMMARY OF THE INVENTION

The present invention relates to a method of enhancing the removal of benzene from a desalter effluent brine by treating the brine with a combination of aluminum chlorohydrate and a water soluble cationic polymer followed by solvent extraction. The ratio of aluminum chloride to polymer can range from 1:10 to 100:1 but preferably is about 6 to 1 salt to polymer on an actives basis. The preferred polymer is polydiallyldimethyl ammonium chloride. The treatment of the present invention removes dispersed oil, solids and oily solids from the brine. These dispersed phases will contain a portion of the benzene present in the effluent brine. In addition, the removal of the dispersed phases enhances the effectiveness of subsequent solvent extraction of benzene. The process of the present invention is done while the effluent is hot (typically about 250° F.) from the desalter or when the effluent brine is subsequently reheated to about 250° F.

DESCRIPTION OF THE PREFERRED EMBODIMENTS

In accordance with the invention described herein it has been discovered that the efficiency of the removal of benzene from a desalter effluent brine in a petroleum refinery can be enhanced by the addition of a combination of aluminum chlorohydrate and a water soluble cationic polymer to the hot effluent brine. The treatment of the present invention is blended with the effluent and dispersed oil, solids and oily solids flocculate. The resultant floc can be easily removed. A significant portion of the benzene present in the effluent brine is removed with the floc. Subsequently, additional benzene is removed by solvent extraction. The efficacy of the solvent extraction phase can be enhanced by the addition of demulsifiers such as Embreak 2W119 (available from Betz Prochem, The Woodlands, Tex.) in a known manner. The percentage of benzene removed by the process of the present invention is greater than that removed by the prior process. The prior process involved only solvent extraction. Such prior process was susceptible to the accumulation of solids at the solvent/brine interface which limited efficacy.

The water soluble cationic polymer of the present invention is selected from the group consisting of water soluble polyamines and water soluble dialkyldiallylammonium polymers. Any water soluble polyamine may be used. As used herein, the term polyamine includes any water soluble product having the following structure:

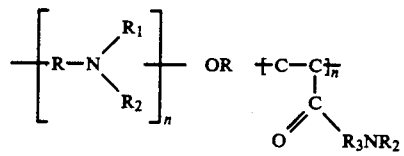

wherein $R_1$ and $R_2$, which may be the same or different, are selected from the group C1-C8 straight or branched alkyl, substituted C1-C8 straight or branched alkyl and hydrogen and, R is selected from the group C1-C8 straight or branched alkyl, and substituted C1-C8 straight or branched alkyl, where $R_3$ is $NHR_1$ or $OR_1$. Any water soluble di C1-C8 alkyl diallyl ammonium polymer can be used. The preferred polymer is diallyldimethyl ammonium chloride (poly DADMAC).

The ratio of aluminum chlorohydrate to polymer is less than 10:1 on an actives basis and preferably 6 to 1 or less on an actives basis.

The combination of the present invention is added to hot (typically about 250°) desalter effluent brine. Flocculated solids are removed and the brine is then subjected to solvent extraction to remove benzene. If the desalter effluent brine is not hot at the time of treatment it should be reheated to about 250° F. prior to separation of the floc. It was found that the treatment of the present invention did not flocculate the solids until after heating to about 250° F. The solvent extraction operation includes the addition of demulsifiers in a known manner.

It was found that the present invention could result in over 91% of the benzene from a desalter effluent brine, up to 63% in the floc and the balance in the subsequent solvent extraction. In comparison, a prior process of only solvent extraction only removed about 86% of the benzene.

The following examples demonstrate the invention in greater detail. The examples are intended to be illustrative only and are not intended to limit the scope of the present invention.

EXAMPLES

The removal of benzene from the desalter effluent brine in a working petroleum refinery was studied. Benzene removal by oil washing (solvent extraction) with and without the chemically induced prior removal of oily solids was studied. Practical process temperatures (250° F.), residence times (20 minutes), mixing action (low shear for solids removal, high shear for oil washing) and chemical dosages (less than about 200 ppm product per brine volume were used to emulate real world conditions. Table 1 summarizes the results of the testing.

invention, that is chemical treatment to remove oily solids at 250° F. followed by solvent extraction with gas oil assisted by a demulsifier. This process left 1.7 ppm benzene (91.4% removal) compared to 2.7 ppm (86.4% removal) without the preseparation of solids and 7.3 ppm or 15.0 ppm without the solvent extraction.

While the present invention has been described with respect to particular embodiments thereof, it is apparent that numerous other forms and modifications of this invention will be obvious to those skilled in the art. The appended claims and this invention should be construed to cover all such obvious forms and modifications which are within the true spirit and scope of the present invention.

What is claimed is:

1. A method of removing benzene from petroleum refinery desalter effluent brine containing dispersed oil, solids, oily solids and benzene comprising contacting the brine with a sufficient amount for the purpose of flocculating oily solids of a combination of a aluminum chlorohydrate and a water soluble cationic polymer selected from the group consisting of polyamines and dialkyldiallylammonium polymers, in a ratio of from 1:10 to 100:1 at a temperature of about 250° F., separating the resulting floc from the brine; and thereafter contacting the brine with a sufficient amount for the purpose of reducing benzene levels in the brine of an oil solvent in combination with a demulsifier.

2. The method of claim 1 wherein said water soluble cationic polymer is polydiallyldimethylammonium chloride.

3. The method claim 1 wherein the ratio of said aluminum chlorhydrate to water soluble cationic polymer is about 6 to 1.

TABLE 1

Benzene Removal

| | Pre-Separation of Oily Solids[1] | | | | Gas Oil Washing[6] | | | Results | | |
|---|---|---|---|---|---|---|---|---|---|---|
| Type of Separation | Temp of Trtmt | Temp of Transfer | Trtmt[7] (ppm) | Demulsi-[7] fier (ppm) | Type of Wash | Trtmnt (ppm) | Demulsi- fier (ppm) | Turbidity of Water | Benzene in Water (ppm) | % Removal |
| None | — | — | — | — | None | — | — | very cloudy | 19.8 | — |
| None | — | — | — | — | DMVS | 0 | 0 | cloudy | 2.7 | 86.4 |
| None | — | — | — | — | DMVS | 100 | 25 | clear | 2.7 | 86.4 |
| Gravity | 75° F. | 75° F. | 100 | 25 | None | — | — | very cldy | not analyzed | |
| Gravity[2] | 250° F. | 75° F.[3] | 100 | 25 | None | — | — | very clear | 7.3 | 63.1 |
| Centrifuge[4] | 250° F. | 150° F.[3] | 125 | 0 | None | — | — | clear | 15.0 | 24.2 |
| Centrifuge[4] | 250° F. | 150° F.[5] | 125 | 0 | DMVS | 0 | 0 | cloudy | 2.0 | 89.9 |
| Centrifuge | 250° F. | 150° F.[5] | 100 | 0 | DMVS | 0 | 25 | cloudy | 1.7 | 91.4 |

Notes:
[1]Chemical added, heat to 250° F., shake, separate floating solids
[2]Settled at 250° for 20 min. Cooled to ambient temp.
[3]Water transferred to GC vial for benzene analysis
[4]Centrifuged at 140° F. for 15 min. (not cooled)
[5]Water transferred to Desalter Mix Valve Simulator (DMVS)
[6]Chemical and 6% HGO added. Heat to 250° F., Mix in DMVS. Settle at 250° F. for 20 min. Cool to ambient. Transfer water to GC vial for benzene analysis.
[7]30% active As can be seen from Table 1, the best benzene removal was achieved by the treatment of the present

* * * * *